(12) United States Patent
Zou

(10) Patent No.: US 7,773,869 B2
(45) Date of Patent: Aug. 10, 2010

(54) LIGHT DIFFUSION BOX FOR PHOTOGRAPHIC USE

(76) Inventor: Jianliang Zou, 15 A, 12th Building, Caitian Village, Shenzhen (CN) 518000

( * ) Notice: Subject to any disclaimer, the term of this patent is extended or adjusted under 35 U.S.C. 154(b) by 715 days.

(21) Appl. No.: 11/571,076

(22) PCT Filed: Apr. 29, 2006

(86) PCT No.: PCT/CN2006/000880
§ 371 (c)(1),
(2), (4) Date: Dec. 21, 2006

(87) PCT Pub. No.: WO2006/116946
PCT Pub. Date: Nov. 9, 2006

(65) Prior Publication Data
US 2007/0230928 A1    Oct. 4, 2007

(30) Foreign Application Priority Data
Apr. 30, 2005    (CN) .................. 2005 2 0058009

(51) Int. Cl.
*G03B 41/00* (2006.01)
(52) U.S. Cl. ......................................... 396/14
(58) Field of Classification Search ................ 396/4, 396/16, 320
See application file for complete search history.

(56) References Cited

U.S. PATENT DOCUMENTS

| 4,446,506 A | 5/1984 | Larson |
| 4,490,776 A | 12/1984 | Kluch |
| 4,669,031 A | 5/1987 | Regester |
| 5,023,756 A | 6/1991 | Regester |
| 5,311,409 A * | 5/1994 | King .......................... 362/17 |

* cited by examiner

Primary Examiner—W. B. Perkey
(74) Attorney, Agent, or Firm—Global IP Services; Tianhua Gu

(57) ABSTRACT

A light diffusion box for photographic use comprises a box body which has an inner surface for reflecting light and an opening at its one end, a light source mounted at the bottom of the box body, and a light-transmitting member. The light-transmitting member includes a light-transmitting area having a specific shape and a light-blocking area formed at the periphery of the light-transmitting area. The light-transmitting area may is of any suitable shape, such as any one of circular, elliptic, stripe, quinquangular, octagonal shape. By forming a light-transmitting area having a specific shape in the light-transmitting member, the light spot projected from the soft light box can exhibit any specific shape, thereby meeting the need of a variety of purposes in photography.

9 Claims, 1 Drawing Sheet

LIGHT DIFFUSION BOX FOR PHOTOGRAPHIC USE

FIELD OF THE INVENTION

The present invention relates to a device for photographic use, specifically it relates to a light diffusion box for photographic use.

BACKGROUND OF THE INVENTION

Light diffusion box have been used extensively at present in order to turn the spot light source to an even flat light source. General, the light diffusion box is made into the shape of pyramid or octagonal cone, and the light source is installed on the top of the housing pyramid. The side-walls of the housing are mounted with reflecting cloth and the last side in the housing, which on the opposite side of the light source is mounted with a fabric diffusion layer. When the light reflects through the housing, the fabric diffusion layer will take on quadrangle or octagon. Due to the requirement of the photography, we sometimes want the shape which the light diffusion box is made has some specific ones, such as: rotundity, ellipse, pentacle, octagon, etc, but the ordinary light diffusion box of pyramid or octagonal cone cannot meet the requirements, in addition, the limited conditions and cost of manufacture, light diffusion box cannot be made to be all kinds of shape to meet different demands. This brings some troubles to photographers and takes bad effect to the photography.

SUMMARY OF THE INVENTION

The present invention is directed to an improved light diffusion box for photographic use which can provide light source in specific shape in order to meet all kinds of demands.

In order to solve the problems above mentioned, the present invention adopts the following technique scheme: a new improved photographic light diffusion box which includes: an opening housing with glistening interior surface; a light source installed at the bottom of said housing; a light-transmitting member attaching to the opening of said housing, and opposite to said light source, wherein said light-transmitting member comprises a light-transmitting area in specific shape and a light-blocking area surrounds said light-transmitting area.

The lighttight shelter covers some areas of the fabric diffusion layer and left a transmission part with specific shape, herewith the facula projected from the light diffusion box will take on a specific shape accordingly. It is the specific shape that the new light diffusion box will meet all kinds of requirements of photography.

BRIEF DESCRIPTION OF THE DRAWINGS

These and other contents of the invention will become apparent as the description proceeds herein when taken in conjunction with the drawings and hereafter following commentary.

DETAILED DESCRIPTION

Figure 1:
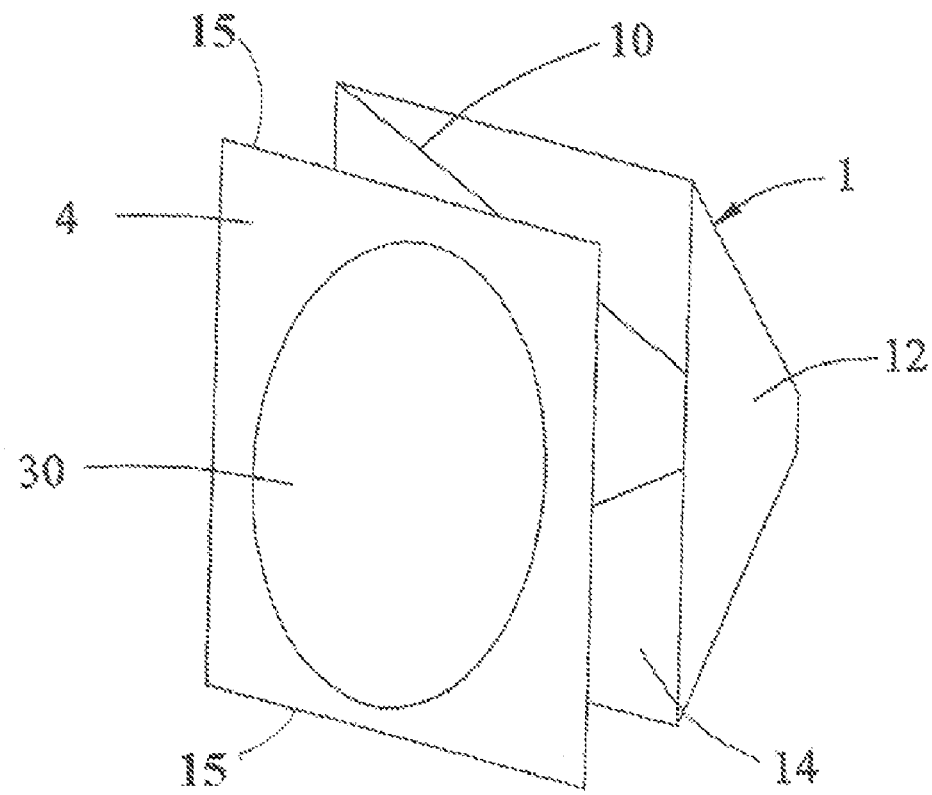
FIG. 1 is a perspective view of the light diffusion box of the present invention.

This invention is shown as the FIG. 1, the light diffusion box includes a housing 1 with inner reflecting surface, light source (unshown) at the bottom of the housing, a light-transmitting member. The light-transmitting member includes a fabric diffusion layer 3 and a shelter layer 4 which is located on the fabric diffusion layer 3. Hence the shelter layer 4 products light-transmitting area and shelter area. The fabric diffusion layer can be made of cloth, paper or other material according with light diffusion for photography.

The housing 1 is almost the same with the ordinary light diffusion box, which can be pyramid, octagonal cone, etc. In this embodiment, the housing 1 includes a frame 10 and a reflecting cloth 12 which is covered on the frame 10. There is an opening 14 at one side of the housing. The inner surface of the reflecting cloth is the reflecting surface, which is used to centralize the deflection light and make them all through the opening 14 of the housing 1.

The light source is located at the bottom of the housing 1, providing the needed light for photography.

The fabric diffusion layer 3 is installed at the opening 14 of the housing 1, in order to envelop the opening 14. The function of the fabric diffusion layer 3 is to make the light become soft, not such strong, then project it onto the screened object. There is a lighttight shelter 4 on the fabric diffusion layer 3 and the material of them can be the same. The inner surface of the lighttight shelter 4 is a reflecting surface which can make the light that project on it coming back to the housing again and make the bright part stronger than before. The uncovered transmission part 30 on the fabric diffusion layer 3 will take on a specific shape. The shape of this transmission part 30 is one of rotundity, ellipse, pentacle, octagon, etc.

Figure 2:
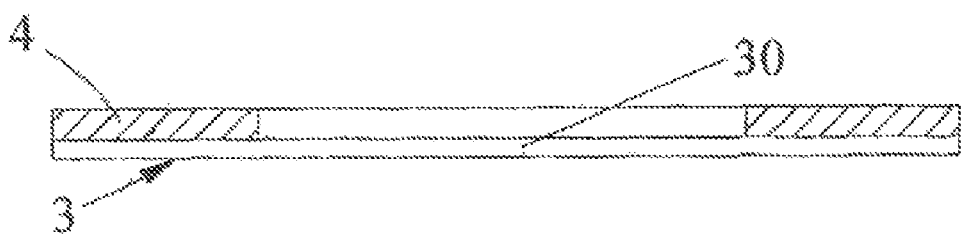
FIGS. 2 and 3 are the cross sectional view about the different joint ways between the fabric diffusion layer and the lighttight shelter of this new invention.

The lighttight shelter 4 is installed removably on the fabric diffusion layer 3, for instance, using a removable piece to stick up the lighttight shelter 4 on the fabric diffusion layer 3. The gramary stick-up paper, magnetic slice is a good choice, as shown in FIG. 2. Moreover, the lighttight shelter 4 can also be covered on the outer side of the fabric diffusion layer 3 and it can be dismantled easily. An elastic ring 15 (in undrawn status) in the brim of the lighttight shelter 4, which can fix the lighttight shelter on the housing. Using this assembling way, the lighttight shelter 4 and the fabric diffusion layer 3 are on two planes.

Figure 3:
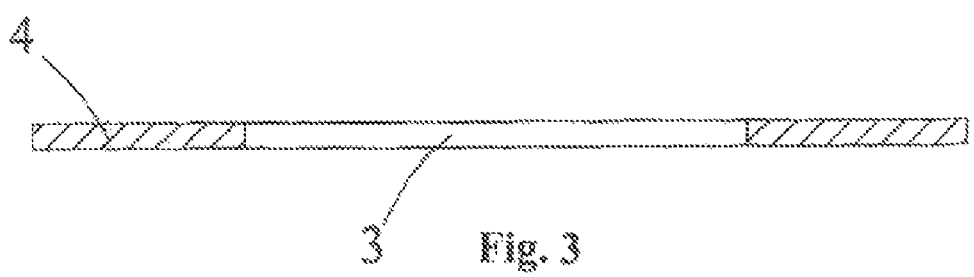

The lighttight shelter 4 and the fabric diffusion layer 3 can be intergraded, such as by sewing together as a unit. Furthermore, as shown in FIG. 3, there is another connecting way between the lighttight shelter and the light fabric layer. The fabric diffusion layer 3 with a specific shape, such as rotundity, ellipse, pentacle, octagon, etc. connects with a lighttight shelter 4 on the brim in the same plane. The edge of the lighttight shelter 4 connects with the housing 1 movably. Instead, the light-transmitting member can be a single fabric diffusion layer and a lighttight shelter forming on the fabric diffusion layer. In an other word, a light-blocking area on the fabric diffusion layer is formed by printing/dyeing/coating, while the unprinted/undyed/uncoated area is a light-transmitting area. The shape of light-transmitting area certainly can be one specific among rotundity, ellipse, pentacle, octagon, etc. In addition, the light-transmitting member can also use only the shelter frame, the fabric diffusion layer is needless. The shelter frame, wherein an aperture in specific shape in the center and the aperture area is the light-transmitting area, while the light-blocking area surrounds the aperture is the shelter area. The shape of this aperture is any one of circular, elliptic, stripe, quinquangular, octagonal shape, etc.

The present invention provides a housing with all kinds of combination of the lighttight shelter 4 and the fabric diffusion layer 3. Therefore, the photographer can choose the corresponding combination according to the required facula shape.

The structure of the housing 1 also has another choice. That is, make a high brightness metal which can reflect light with the shape of groove as the housing, install several daylight lamp as the light source at the bottom of this groove. The fabric diffusion layer 3 and the lighttight shelter 4 are fit at the notch of the groove.

The lighttight shelter 4 covers some areas of the fabric diffusion layer 3 and left a transmission part 30 with specific shape, herewith the facula projected from the light diffusion box will take on a specific shape accordingly. It is the specific shape that the new light diffusion box will meet all kinds of requirements of photography.

The invention claimed is:

1. A light diffusion box for photographic use, comprising:
   a housing having an opening and glistening interior surface, in which a light source can be mounted;
   a light-transmitting member attached on the opening of said housing, and at opposite side of said light source;
   said light-transmitting member comprising a fabric diffusion layer and a lighttight shelter layer located on said fabric diffusion layer becoming a light-blocking area, thereby the unsheltered area of said fabric diffusion layer becoming a light transmitting area with a specific shape; and said shelter layer being removably attached to said fabric diffusion layer;
   an elastic ring existed on a brim of said shelter layer for fixing the shelter layer on the housing.

2. The light diffusion box of claim 1, wherein said shelter layer is removably covered on said fabric diffusion layer from outside.

3. The light diffusion box of claim 1, wherein the inner surface of said shelter layer is a glistening surface.

4. The light diffusion box of claim 2, wherein the inner surface of said shelter layer is a glistening surface.

5. The light diffusion box of claim 4, wherein said housing is in shape of pyramid or octagonal cone, said housing has a frame and a glistening fabric cover on the frame.

6. The light diffusion box of claim 1, wherein said light-transmitting member is a single fabric diffusion layer, and said lighttight shelter made by printing/dyeing/coating on said fabric diffusion layer, and the unprinted/undyed/uncoated area becoming said light-transmitting area.

7. A light diffusion box for photographic use comprising:
   a housing having an opening and glistening interior surface, in which a light source can be mounted;
   a light-transmitting member attached on the opening of said housing, and at opposite side of said light source;
   the light-transmitting member is a single fabric diffusion layer with light-blocking areas made by printing/dyeing/coating and the unprinted/undyed/uncoated area becoming light-transmitting area.

8. The light diffusion box of claim 7, wherein said light-transmitting area is any one of circular, elliptic, strip, quinquangular, octagonal shape.

9. The light diffusion box of claim 7, wherein the inner surface of said light-blocking area is glistening surface.

* * * * *